(12) United States Patent
Grzybowski et al.

(10) Patent No.: US 10,883,249 B2
(45) Date of Patent: Jan. 5, 2021

(54) QUICK CONNECT AND DISCONNECT HAMMER TOOL

(71) Applicant: Caterpillar Inc., Peoria, IL (US)

(72) Inventors: Joshua Grzybowski, Clayton, NC (US); Dennis Wai Man Tang, Hewitt, TX (US); Francis Eric Fortner, Woodway, TX (US); Curtis A. Henning, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 165 days.

(21) Appl. No.: 15/947,189

(22) Filed: Apr. 6, 2018

(65) Prior Publication Data

US 2019/0309498 A1    Oct. 10, 2019

(51) Int. Cl.
| | | |
|---|---|---|
| *E02F 3/96* | (2006.01) | |
| *E02F 3/36* | (2006.01) | |
| *F16B 21/16* | (2006.01) | |
| *B25D 17/08* | (2006.01) | |

(52) U.S. Cl.
CPC .............. *E02F 3/966* (2013.01); *B25D 17/08* (2013.01); *E02F 3/3663* (2013.01); *F16B 21/16* (2013.01); *B25D 2217/0038* (2013.01); *B25D 2217/0053* (2013.01); *B25D 2250/125* (2013.01); *B25D 2250/371* (2013.01)

(58) Field of Classification Search
CPC ......... E02F 3/966; E02F 3/3663; F16B 21/16; B25D 2250/125; B25D 2250/371; B25D 2217/0053; B25D 2217/0038; B25D 17/08; Y10T 292/0969; Y10T 292/097; Y10T 292/0997; Y10T 292/1014; Y10T 292/1022; Y10T 292/1023; Y10T 292/1024; Y10T 292/1028; Y10T 292/432; Y10T 292/696; E05C 1/002; E05C 1/004; E05C 1/08; E05C 1/085; E05C 1/10; E05B 63/128; E05B 51/02; E05B 2051/026
See application file for complete search history.

(56) References Cited

U.S. PATENT DOCUMENTS

| | | | | |
|---|---|---|---|---|
| 2,489,864 | A * | 11/1949 | Cravener | B66C 1/10 |
| | | | | 294/82.35 |
| 4,202,557 | A | 5/1980 | Haussmann | |
| 4,691,948 | A * | 9/1987 | Austin, Jr. | E05B 51/02 |
| | | | | 292/144 |
| 5,042,854 | A * | 8/1991 | Huang | E05C 1/10 |
| | | | | 292/163 |

(Continued)

FOREIGN PATENT DOCUMENTS

| | | |
|---|---|---|
| CA | 2378667 A1 | 9/2003 |
| DE | 1069537 B | 11/1959 |

(Continued)

*Primary Examiner* — Thomas M Wittenschlaeger
(74) *Attorney, Agent, or Firm* — Law Office of Kurt J. Fugman LLC

(57) ABSTRACT

A method of retaining a hammer tool in the front head of a powercell assembly of a hammer assembly includes biasing a hammer tool retaining pin such that a portion of the tool retaining pin extends into a tool receiving bore of the front head of the powercell assembly, holding a hammer tool in the tool receiving bore of the front head of the powercell assembly via the tool retaining pin, and releasing the hammer tool remotely from the hammer assembly.

8 Claims, 5 Drawing Sheets

(56) References Cited

U.S. PATENT DOCUMENTS

| | | | | |
|---|---|---|---|---|
| 5,096,236 A * | 3/1992 | Thony | ................ | F16B 21/06 |
| | | | | 24/674 |
| 6,672,183 B2 * | 1/2004 | Johnson | ............. | B25B 23/0035 |
| | | | | 81/177.85 |
| 6,840,705 B2 * | 1/2005 | Rager | ................ | A61G 13/12 |
| | | | | 403/321 |
| 8,667,875 B2 * | 3/2014 | Haman | ................ | B25B 21/02 |
| | | | | 81/463 |
| 9,566,702 B2 | 2/2017 | Kuzma | | |
| 9,592,598 B2 * | 3/2017 | Moore | ................ | B25D 9/145 |
| 9,701,003 B2 * | 7/2017 | Moore | ................ | B25D 9/12 |
| 2015/0360361 A1 * | 12/2015 | Gunasekaran | ........ | B25D 17/00 |
| | | | | 173/90 |
| 2017/0036336 A1 * | 2/2017 | Moore | ................ | E02F 3/966 |
| 2017/0113337 A1 | 4/2017 | Dostinov | | |
| 2017/0136611 A1 | 5/2017 | Moore | | |
| 2018/0297187 A1 * | 10/2018 | Piras | ................ | B25D 17/245 |

FOREIGN PATENT DOCUMENTS

| | | | |
|---|---|---|---|
| DE | 4419826 | A1 | 12/1995 |
| DE | 4136584 | B4 | 10/2004 |
| EP | 1762310 | B1 | 11/2007 |
| EP | 1559515 | B1 | 10/2012 |
| GB | 2047605 | A | 12/1980 |

\* cited by examiner

QUICK CONNECT AND DISCONNECT HAMMER TOOL

TECHNICAL FIELD

The present disclosure relates to the field of machines that perform work on a material using work implements such as excavators and the like employing a hammer assembly with a hammer tool to break up a material. Specifically, the present disclosure relates to a quick connect and disconnect mechanism for attaching a detaching a hammer tool to a hammer assembly.

BACKGROUND

Hammer tools of hammer assemblies often need to be replaced in the field for a host or reasons. For example, the hammer tool may become worn or damaged. So, the field technician may need to replace the hammer tool. Also, hammer tools may come in a variety of configurations, materials, etc. to suit a particular application. Consequently, if the intended application for the hammer tool changes, then the hammer tool may be swapped out for a different style of hammer tool.

Various mechanisms and methods of assembly have been developed over time to facilitate the attachment and detachment of hammer tools to a hammer assembly. For example, hammer tools may be held in place with transverse pins or splines on the tool rotated out of orientation with corresponding hammer casing splines. This may require an assembly process necessitating the use of hand tools and/or repositioning of hammer assembly to release the hammer tool. Thus, changing tools in the field can be a fairly slow and cumbersome process.

Accordingly, it is desirable to develop a quick connect and disconnect mechanism for attaching and detaching hammer tools from a hammer assembly that is easier and quicker to use than has heretofore been devised.

SUMMARY OF THE DISCLOSURE

A tool retaining pin for use with a hammer assembly according to an embodiment of the present disclosure is provided. The tool retaining pin comprises a body defining a longitudinal axis, a forward tool retaining portion, and a rear tool retaining pin activation portion. The forward tool retaining portion defines a first maximum dimension measured along a direction perpendicular to the longitudinal axis, and the rear tool pin activation portion defines a second maximum dimension measured along a direction perpendicular to the longitudinal axis that is greater than the first maximum dimension.

A powercell assembly for use with a hammer assembly according to an embodiment of the present disclosure is provided. The power cell assembly comprises a front head defining an exterior, a first bore defining a hammer tool movement axis and a first bore maximum dimension measured along a direction perpendicular to the hammer tool movement axis, a second bore defining a second bore maximum dimension measured along a direction parallel to the hammer tool movement axis, the second bore extending from the first bore along a second bore longitudinal axis that forms a first oblique angle with the hammer tool movement axis, and a third bore defining a third bore maximum dimension measured along a direction parallel to the hammer tool movement axis, the third bore extending from the second bore along a third bore longitudinal axis that forms a second oblique angle with the hammer tool movement axis. The third bore maximum dimension is greater than the second bore maximum dimension.

A method of retaining a hammer tool in the front head of a powercell assembly of a hammer assembly according to an embodiment of the present disclosure is provided. The method comprises biasing a hammer tool retaining pin such that a portion of the tool retaining pin extends into a tool receiving bore of the front head of the powercell assembly, holding a hammer tool in the tool receiving bore of the front head of the powercell assembly via the tool retaining pin, and releasing the hammer tool remotely from the hammer assembly.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
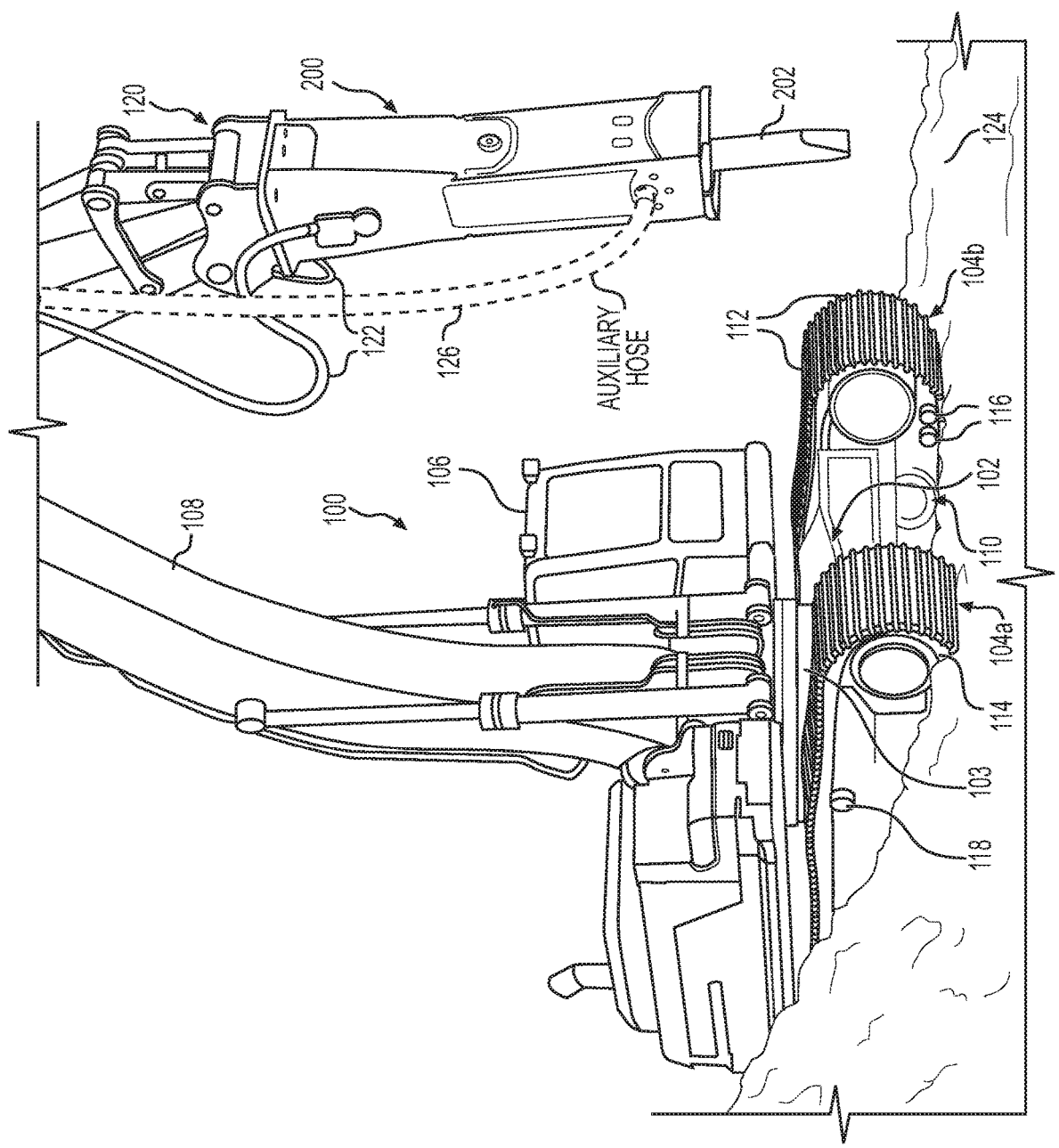
FIG. 1 is a perspective view of a machine such as an excavator using a hammer assembly according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a tool retaining pin, a powercell assembly using a tool retaining pin for use with a hammer assembly, and a method of assembly/operation for attaching or detaching the hammer tool to the hammer assembly according to various embodiments of the present disclosure will be described herein. Furthermore, a machine that may use a tool retaining pin, a powercell assembly using a tool retaining pin for use with a hammer assembly, and a method of assembly/operation for attaching or detaching the hammer tool to the hammer assembly according to various embodiments of the present disclosure will be described herein.

Referring to FIG. 1, there is shown a machine 100 having a frame 102 with a track system, including a first track 104a and a second track 104b positioned at opposite sides of frame 102. Machine 100 is shown in the context of an excavator having an operator cab 106 coupled to the frame 102 via a turntable 103, a linkage 108 and a hammer assembly 200 coupled with linkage 108. Tracks 104a and 104b are part of a machine undercarriage 110 coupled with the frame 102 in a conventional manner. Each of tracks 104a and 104b include a plurality of coupled together track shoes 112 forming endless loops extending about a plurality of rotatable elements.

In a typical design, an idler 114 and a drive sprocket (not shown) will be associated with each of tracks 104a and 104b and mounted to the frame 102. A plurality of track rollers 116 may also be mounted to the frame 102, and are associated with each of tracks 104a and 104b to support the machine 100 and guide tracks 104a and 104b in desired paths. One or more carrier rollers 118 may also be associated with each of tracks 104a and 104b to support and guide the tracks opposite track rollers 116 during operation. While use in the machine environment of an excavator is emphasized herein, it should be understood that machine 100 might comprise a different type of machine. For instance, track-type tractors or even half-track machines are contemplated herein. Further still, machine 100 might consist of a conveyor or other type of machine wherein tracks are used for purposes other than as ground engaging elements. Also, the machine might be some type of backhoe loader, bulldozer, etc.

With continued reference to FIG. 1, the hammer assembly 200 is attached to the linkage 108 via mounting structure 120 (may also include a mounting bracket, etc.). Hydraulic connecting lines 122 are provided that connect the hammer assembly 200 to provide the motive force (via a pump not shown) that moves the hammer tool 202 up and down to break up ground 124 or other work material. One or more auxiliary lines 126 may also be provided to power the quick connect and disconnect mechanism for detaching the hammer tool 202 remotely. More specifically, the cab 106 may house a button or switch (not shown) that may be activated by the user, activating the mechanism and causing the hammer assembly 200 to drop the hammer tool 202.

Figure 2:
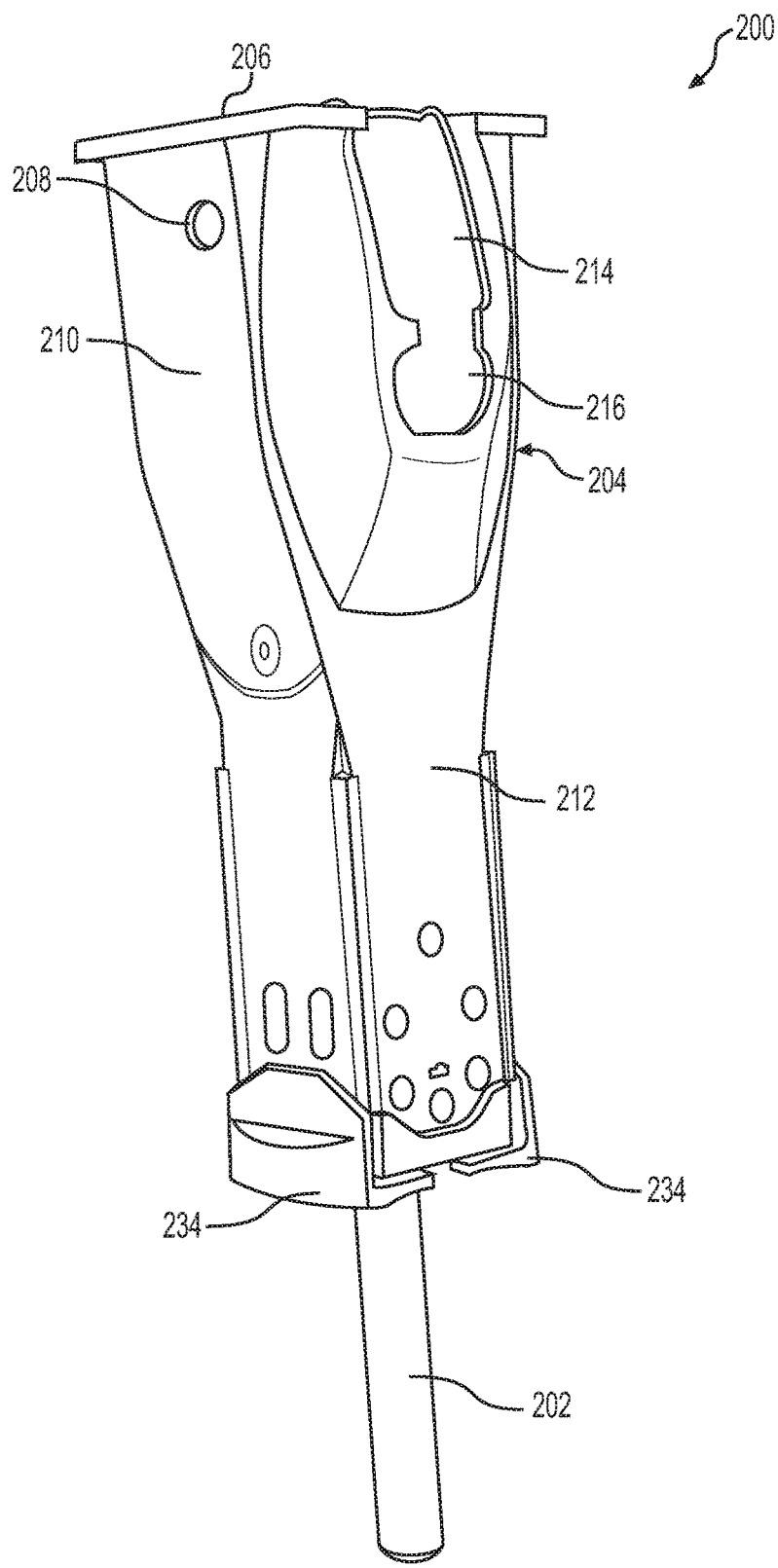
FIG. 2 is a perspective view of the hammer assembly of FIG. 1 shown in isolation from the machine of FIG. 1.

Referring now to FIG. 2, the hammer assembly 200 is shown by itself. The hammer assembly 200 comprises a housing 204 that has various components with useful features. The top mounting bracket 206 is shown, used to connect the hammer assembly 200 to the linkage 108 of the machine 100. The housing 204 defines a front aperture 208 that allows for the accumulator (not shown in FIG. 2), to be recharged while mounted on the machine 100. The front panel 210, which defines the front aperture 208, has a sleek curved profile that helps to concentrate stress to the most robust areas of the housing.

The side panel 212 defines an upper side aperture 214 and a lower side aperture 216. The upper side aperture 214 allows access to a pressure control valve (not shown in FIG. 2) that allows adjustment of the pressure without needing to remove or disassembly the hammer assembly 200. The lower side aperture 216 allows for maintenance and adjustment. More specifically, rubber side covers (not clearly shown) are replaced easily. This allows access to the pressure control valve, autolube connection (not shown), and return and supply hydraulic connections (not shown). The side panels 212 extend from the top of the hammer assembly 200 to the bottom of the hammer assembly 200 as one piece. Hence, there are no welds that may create weak points in the hammer assembly 200. Rock edges are provided at the bottom of the hammer assembly 200 to protect it from debris.

Figure 3:
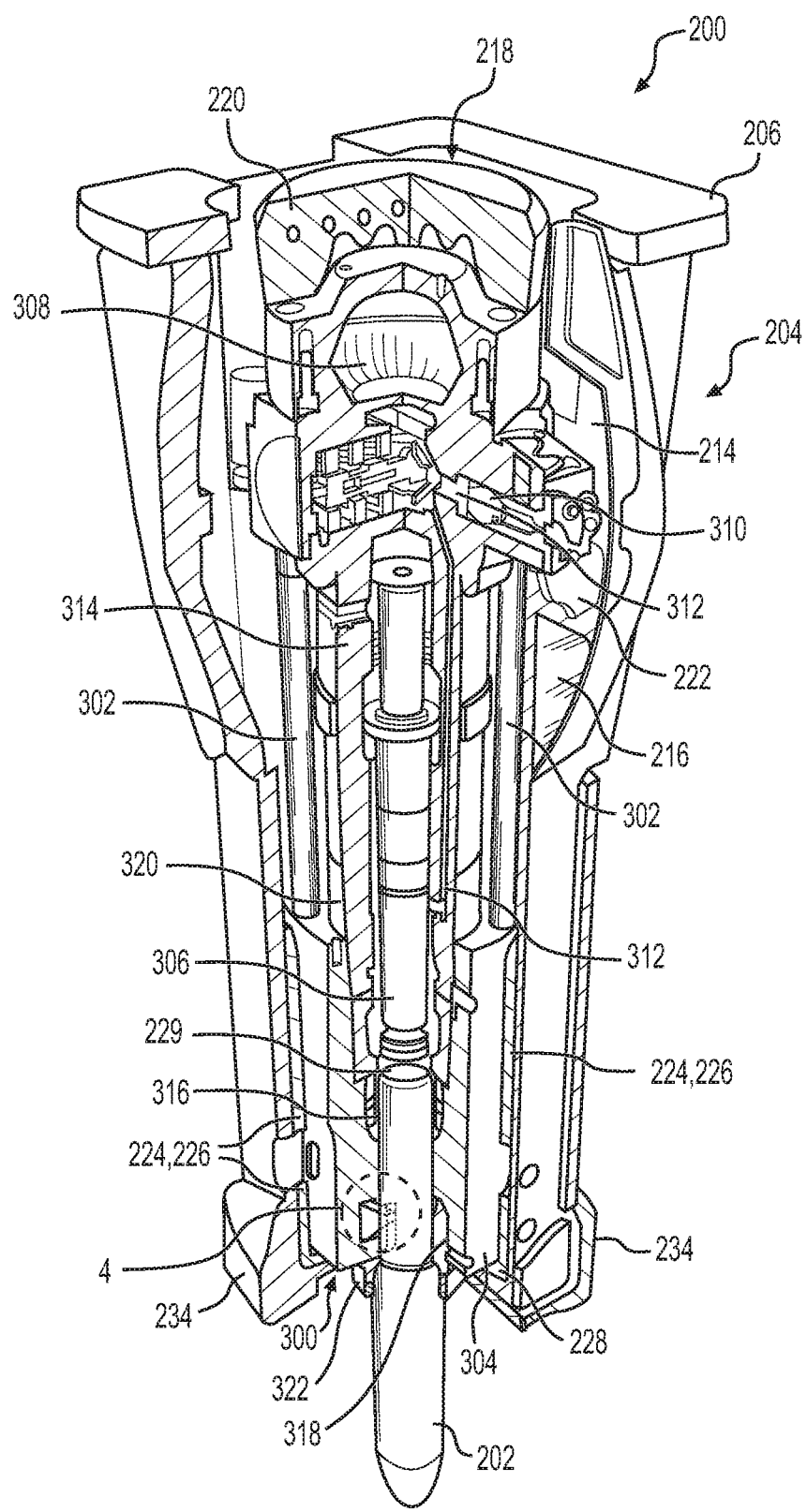
FIG. 3 is a perspective sectional view of the hammer assembly of FIG. 2, depicting the inner workings of the hammer assembly including the powercell assembly.

Turning to FIG. 3, the inner workings of the hammer assembly 200 may be seen as the hammer assembly 200 is shown in a V-shaped cross-section. Various features and components of the hammer assembly 200 will now be discussed starting at the top of the assembly.

The hammer assembly 200 includes a suspension system 218 that allows recoil while also providing support and guidance, helping to protect the carrier (not shown), and increasing the durability of the hammer assembly 200. Noise created by the hammer assembly 200 may be reduced as well as the amount of vibration conveyed to the machine 100. Control of the hammer assembly 200 may also be improved. The suspension system 218 includes a large top buffer 220 that absorbs vibration from the hammer tool 202, helping to limit impulses from reaching the carder. Two side buffers 222 are also provided that help stabilize reflective forces and dampen the loading of the tie rods 302 of the powercell assembly 300. These side buffers 222 are easily replaced via the lower side aperture 216. Located near the bottom of the hammer assembly 200, the suspension system 218 further comprises an interlocking quad wear system 224. Wear plates 226 are provided that guide and support the front head 304 of the powercell assembly 300. These wear plates 226 may be rotated 90 degrees to double their service life. Finally, a lower buffer 228 is provided to cushion vibrations as they are imparted to the bottom of the hammer assembly 200 as the hammer tool 202 and piston 306 reciprocate.

Returning to the top of the hammer assembly 200 of FIG. 3, an accumulator 308 is provided that includes a self-contained membrane designed for long life. The port for the accumulator 308 is accessible as alluded to earlier herein while the hammer assembly 200 is mounted on the machine 100, making testing and recharging more easily done in the field.

As mentioned previously herein, a pressure control valve (PCV) 310 maintains hydraulic pressure to help ensure that the hammer assembly delivers all blows at full power. The PCV can be easily checked and adjusted from outside the hammer assembly 200 via the upper side aperture 214. A check valve on the inlet side (not shown) helps to isolate harmful pulsation spikes from the carrier hydraulic circuit (not shown).

An auto-shut off feature (ASO) 312 is provided via hydraulic passages, etc. to help stop the piston 306 when the hammer tool 202 breaks through the ground or other work material. This is often referred to as blank firing, which is a leading cause of hammer assembly 200 wear. Reducing this type of wear may reduce the need for maintenance and allows more production time.

An autolube connection and grease channel is also provided (not shown). This allows grease to be fed to the upper and lower tool bushings 316, 318 to provide enough grease, helping to increase the life of the bushings 316, 318 and the hammer tool 202. The upper tool bushing 316 may guide the hammer tool 202 to optimize the in-line piston 306 to hammer tool 202 contact. The lower tool bushing 318 may be configured that as it reaches its wear limit, it can be easily rotated by 90 degrees or replaced to bring its dimensions back into a desired range or specification. Dust seals 322 may extend from the bottom of the lower tool bushing, contacting the hammer tool 202 to help keep out contaminants.

A seal carrier 314 is provided on the opposite side of the powercell assembly 300 relative to the ASO 312. The seal carrier 314 contains high performance seals that help to extend the leak-proof operation of the hammer assembly 200.

The piston 306 slides back and forth in the bore of the cylinder 320 of the powercell assembly 300 via hydraulic fluid, repeatedly hammering on the rear free end 229 of the hammer tool 202, causing the hammer tool 202 to reciprocate. The cylinder 320 is engineered to be durable and reliable with a minimal amount of maintenance and down time.

An enlarged detail view area 4 is designated near the bottom of the hammer assembly 200 discloses roughly some details of the quick connect and disconnect hammer tool mechanism of the present disclosure. This enlarged detail view area 4 is shown most clearly in FIG. 4.

Figure 4:
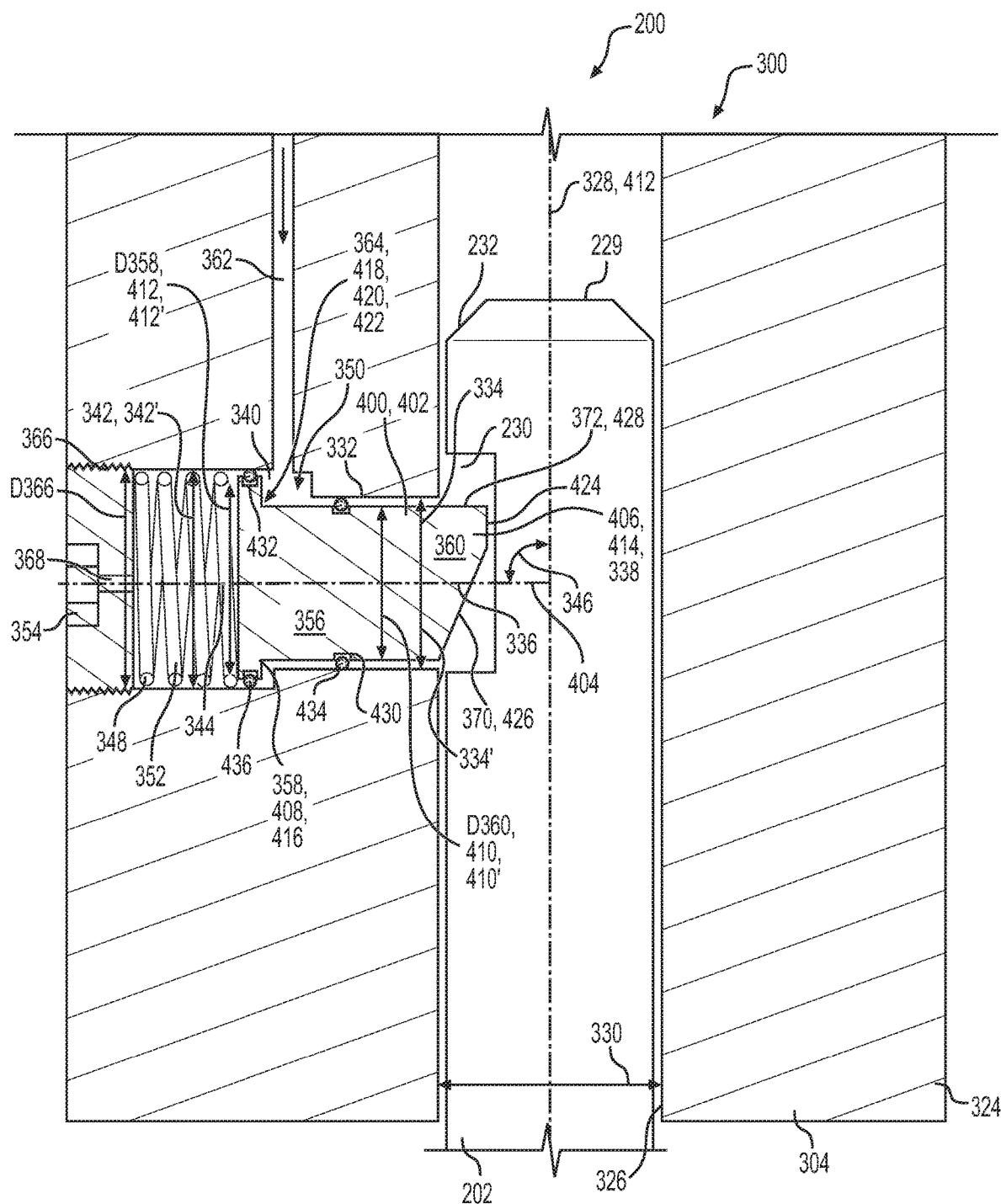
FIG. 4 is an enlarged detail view of the section of the hammer assembly of FIG. 3, showing more clearly a quick connect and disconnect mechanism for retaining a hammer tool according to an embodiment of the present disclosure.

Focusing now on FIG. 4, a powercell assembly 300 for use with a hammer assembly 200 according to an embodiment of the present disclosure that provides a quick connect and disconnect hammer tool mechanism will be discussed. The power cell assembly 300 may comprise a front head 304 defining an exterior 324 and a first bore 326 defining a hammer tool movement axis 328 and a first bore maximum dimension 330 measured along a direction perpendicular to the hammer tool movement axis 328. The front head 304 may further define a second bore 332 defining a second bore maximum dimension 334 measured along a direction parallel to the hammer tool movement axis 328. The second bore 332 may extend from the first bore 326 along a second bore longitudinal axis 336 that forms a first oblique angle 338 with the hammer tool movement axis 328. The front head 304 may further define a third bore 340 defining a third bore maximum dimension 342 measured along a direction parallel to the hammer tool movement axis 328. The third bore 340 may extend from the second bore 332 along a third bore longitudinal axis 344 that forms a second oblique angle 346 with the hammer tool movement axis 328. In many embodiments, the angles 338, 346 are right angles and the axes 336, 344 are collinear. This may not be the case in other embodiments. Similarly, in some embodiments, the third bore maximum dimension 342 may be greater than the second bore maximum dimension 334 as shown in FIG. 4. Again, this may not be the case in other embodiments.

The powercell assembly 300 may further comprise a tool retaining pin extension mechanism 348 operatively associated with the third bore 340 and a tool retaining pin retraction mechanism 350 operatively associated with the third bore 340. For the embodiment shown in FIG. 4, the tool retaining pin extension mechanism 348 includes a spring 352. For example, a compression coil spring may be provided that is sandwiched between a breather plug 354 and behind the tool retaining pin 356. In other embodiments, the swing 352 could be an extension swing located forward of the head portion 358 of the tool retaining pin 356.

For the embodiment shown in FIG. 4, the tool retaining pin retraction mechanism 350 includes a fluid conveying bore 362 that is in communication with the third bore 340. For example, hydraulic fluid may be provided via an auxiliary line 126 (see FIG. 1) that is in communication with a pump (not shown) of the machine 100. Though not shown, a throttling valve or pressure control valve may be disposed in or be in communication with the fluid conveying bore 362 to reduce the pressure of the hydraulic fluid that contacts the head portion 358 of the tool retaining pin 356 to move the tool retaining pin 356 so that the shaft portion 360 of the tool retaining pin 356 is no longer in the notch 230 of the hammer tool 202.

More specifically, the shaft portion 360 is disposed in the second bore 332 and the head portion 358 is disposed in the third bore 340. In many embodiments, the shaft portion 360, head portion 358, the second bore 332 and the third bore 340 each have a cylindrical configuration. The second bore diameter 334' is less than the third bore diameter 342' and the head portion diameter D358 is greater than the shaft portion diameter D360. This creates an annular activation surface 364 that the hydraulic fluid or other type of fluid may contact. The fluid conveying bore 362 is in communication with the third bore 340 axially adjacent the second bore 332 such that incoming fluid may contact the shaft portion 360 and pushes on the annular activation surface 364, overcoming the spring force of the spring 352, causing the tool retaining pin 356 to retract, dropping the hammer tool 202 when the hammer assembly 200 is substantially vertical as a result of the weight of the hammer tool 202.

Other types of mechanisms may be used to move the tool retaining pin 356 to retract or extend the tool retaining pin 356 into and out of the first bore 326. For example, solenoids, magnets, cams, rack and pinion or other gear type mechanisms, pneumatics, etc. may be employed to effectuate the desired movement of the tool retaining pin.

The front head 304 further may further define a fourth bore 366 extending from the third bore 340 to the exterior 324 of the hammer assembly 200. The fourth bore 366 may also have a fourth bore diameter D366 than the third bore diameter 342'. This may facilitate assembly as the tool retaining pin 356 may be first placed into the second bore 332, then the spring 352 may be placed into the third bore 340, and finally a breather plug 354 may be placed into the fourth bore 366, completing the assembly. The breather plug 354 is disposed in the fourth bore 366 and may include a small orifice 368 to allow air to exit and enter the third bore 340 as the tool retaining pin 356 moves back and forth.

Although not shown, timing features may ensure the proper circumferential orientation of the tool retaining pin 356. For example, a tool retaining pin lead-in 370 may be provided that is similarly or identically configured to a hammer tool lead-in 232 so that as the hammer tool 202 is inserted upwardly into the first bore 326, the tool retaining pin 356 is forced to retract until the tool retaining pin 356 is forced back into the notch 2330 of the hammer tool 202. Of course, this means that the hydraulic fluid pressure has already been removed or is not otherwise present. The timing features may involve the use of a key and keyway such as a dowel pin that extends radially from the head portion of the tool retaining pin into a corresponding slot of the front head 304. So, the lead-in 370 of the tool retaining pin 356 will be properly aligned with the lead-in 232 of the hammer tool 202 to effectuate the desired cam action to move the tool retaining pin 356. The top side 372 of the tool retaining pin 356 opposite of the tool retaining pin lead-in 370 may be sharp, helping to ensure a robust catch point to prevent the unintentional removal of the hammer tool 202. Lead-ins 232, 370 may take any suitable form such as blends, chamfers, etc.

With continued reference to FIG. 4, a tool retaining pin 400 for use with a hammer assembly 200 according to an embodiment of the present disclosure may be characterized as follows. The tool retaining pin 400 may comprise a body 402 defining a longitudinal axis 404, a forward tool retaining portion 406 disposed along the longitudinal axis 404, and a rear tool retaining pin activation portion 408 disposed along the longitudinal axis 404. The forward tool retaining portion 406 may define a first maximum dimension 410 measured along a direction perpendicular to the longitudinal axis 404, and the rear tool pin activation portion 408 may define a second maximum dimension 412 measured along a direction perpendicular to the longitudinal axis 404 that is greater than the first maximum dimension 410.

The forward tool retaining portion 406 may include a first cylindrical portion 414 and the rear tool retaining pin activation portion 408 includes a second cylindrical portion 416. Hence, the first maximum dimension 410 is a first diameter 410' defined by the first cylindrical portion 414 and the second maximum dimension 412 is a second diameter 412' defined by the second cylindrical portion 416. The first diameter 410' is less than the second diameter 412', forming a shoulder 418 defining a surface area 420 forming an oblique angle 422 to the longitudinal axis 404. The angle 422 may be a right angle. Hence, the shoulder 418 will be pushed by a fluid force acting on it to move the tool retaining pin 400 into a retracted position.

The forward tool retaining portion 406 terminates in a free end 424 having a cam surface 426 and a sharp top side 428 circumferentially opposite of the cam surface 426. The cam surface 426 provides a cam-action as this cam surface 426 is contacted by the rear free end 229 of the hammer tool 202 to move the pin 400 into the retracted position. This cam surface 426 may be omitted in other embodiments.

The first cylindrical portion 414 may define a first seal retaining slot 430 extending about the circumference and the second cylindrical portion 416 may define a second seal retaining slot 432 extending about the circumference. A first seal 434 such as an o-ring may disposed in the first seal retaining slot 430 and a second seal 436 such as another o-ring may be disposed in the second seal retaining slot 432. In other embodiments, the retaining slots 430, 432 and seals 434, 436 may be disposed on the front head 304 in the second bore 332 and the third bore 340, etc.

As used herein, the terms "upper", "lower", "top", "bottom", "rear", "rearward", "forward", "forwardly", etc. are to be interpreted relative to an axis of a bore or the vertical or horizontal directions when the hammer assembly is used in a substantially vertical orientation. In cases when the hammer assembly is not substantially vertical, these terms including "upper" may be interpreted as "first" and "lower" as "second", etc.

The configuration of any embodiment of any component of the present disclosure such as the tool retaining pin, as well as associated features, dimensions, angles, surface areas, and ratios may be adjusted as needed or desired to be different than what is specifically mentioned in the specification or the drawings of the present application.

INDUSTRIAL APPLICABILITY

In practice, a tool retaining pin, a kit including a breather plug, a tool retaining pin and a spring, a hammer assembly using a tool retaining pin, or a powercell assembly according to any of the embodiments discussed herein, etc. may be sold, manufactured, retrofitted, assembled, or otherwise obtained or provided in an OEM (original equipment manufacturer) or aftermarket context.

Figure 5:
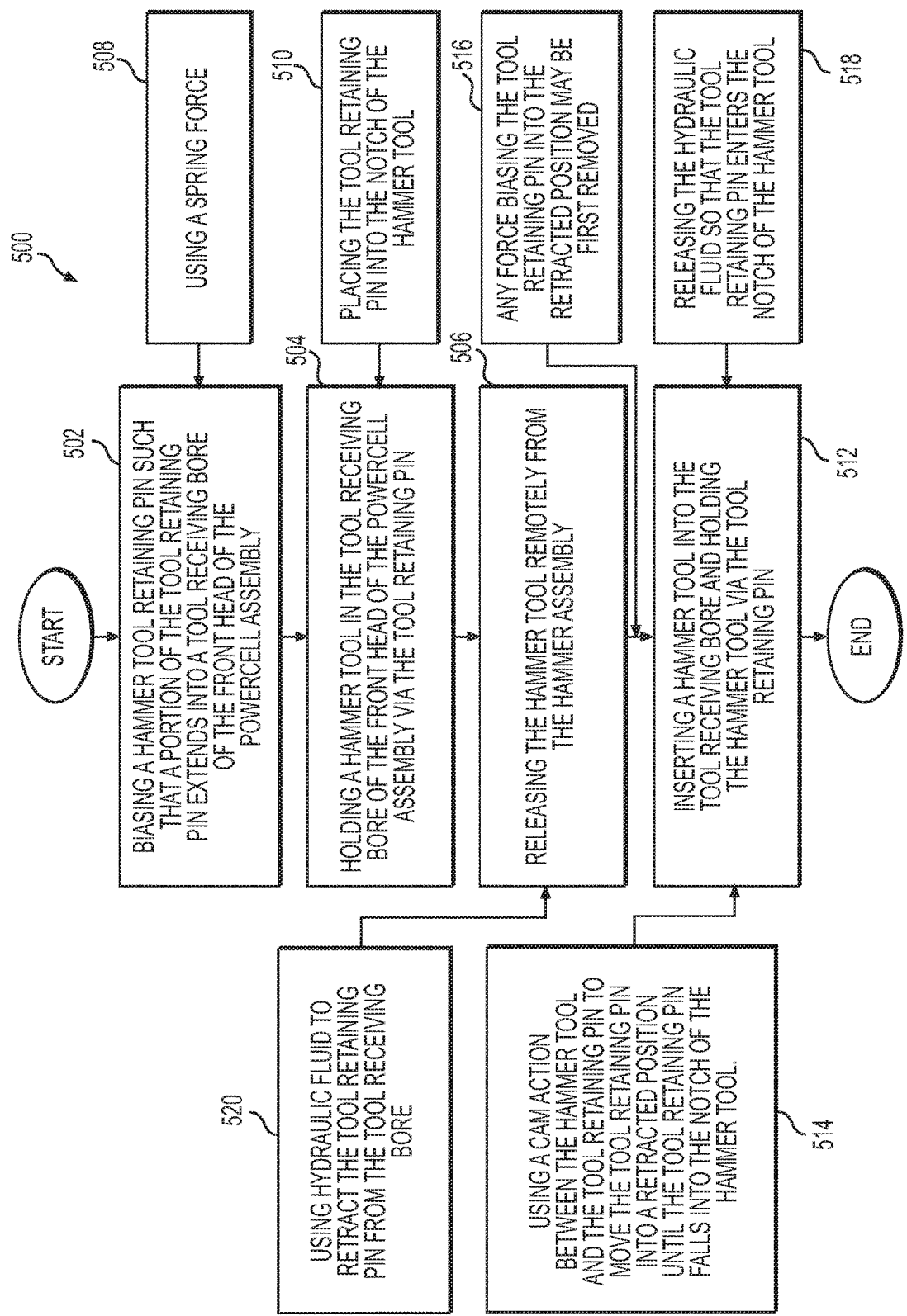
FIG. 5 is a flowchart illustrating a method of assembly or disassembly of a hammer tool using the quick connect and disconnect mechanism of FIG. 4.

Various embodiments may allow a method of assembly/operation to be implement as depicted in FIG. 5. The method 500 may comprise biasing a hammer tool retaining pin such that a portion of the tool retaining pin extends into a tool receiving bore of the front head of the powercell assembly (step 502), holding a hammer tool in the tool receiving bore of the front head of the powercell assembly via the tool retaining pin (step 504), and releasing the hammer tool remotely from the hammer assembly (step 506). Biasing the hammer tool may include using a spring force (step 508). Holding the hammer tool may include placing the tool retaining pin into the notch of the hammer tool (step 510).

The method may further comprise inserting a hammer tool into the tool receiving bore and holding the hammer tool via the tool retaining pin (step 512). This may include using a cam action between the hammer tool and the tool retaining pin to move the tool retaining pin into a retracted position until the tool retaining pin falls into the notch of the hammer tool (step 514). In such a case, any force biasing the tool retaining pin into the retracted position may be first removed (step 516). In other embodiments, the method may include releasing the hydraulic fluid so that the tool retaining pin enters the notch of the hammer tool (step 518) after step 512.

Releasing the hammer tool remotely may include using hydraulic fluid to retract the tool retaining pin from the tool receiving bore (step 520).

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. Also, the numbers recited are also part of the range.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps or combined. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A powercell assembly for use with a hammer assembly, the power cell assembly comprising:
   a front head defining
      an exterior;

a first bore defining a hammer tool movement axis and a first bore maximum dimension measured along a direction perpendicular to the hammer tool movement axis, a second bore defining a second bore maximum dimension measured along a direction parallel to the hammer tool movement axis, the second bore extending from the first bore along a second bore longitudinal axis that forms a first oblique angle with the hammer tool movement axis;

a third bore defining a third bore maximum dimension measured along a direction parallel to the hammer tool movement axis, the third bore extending from the second bore along a third bore longitudinal axis that forms a second oblique angle with the hammer tool movement axis;

wherein the third bore maximum dimension is greater than the second bore maximum dimension, and the front head further defines a fourth bore extending from the third bore to the exterior at atmospheric pressure.

2. The powercell assembly of claim 1, further comprising a tool retaining pin extension mechanism operatively associated with the third bore and a tool retaining pin retraction mechanism operatively associated with the third bore.

3. The powercell assembly of claim 2, wherein the tool retaining pin extension mechanism includes a spring.

4. The powercell assembly of claim 3, wherein the spring is a compression coil spring.

5. The powercell assembly of claim 3, wherein the tool retaining pin retraction mechanism includes a fluid conveying bore that is in communication with the third bore.

6. The powercell assembly of claim 5, further comprising a tool retaining pin including a shaft portion and a head portion, the shaft portion being disposed in the second bore and the head portion being disposed in the third bore.

7. The powercell assembly of claim 6, wherein the fluid conveying bore is in communication with the third bore adjacent the second bore and the spring is disposed in the third bore behind the head portion of the tool retaining pin.

8. The powercell assembly of claim 1, further comprising a breather plug disposed in the fourth bore.

* * * * *